United States Patent [19]
Kondo

[11] 3,987,473
[45] Oct. 19, 1976

[54] ELECTROMAGNETIC FOCAL PLANE SHUTTER
[75] Inventor: Toshihiro Kondo, Chofu, Japan
[73] Assignees: Toshihiro Kondo, Tokyo; Fuji Photo Film Co., Ltd., both of Japan; part interest to each
[22] Filed: Nov. 26, 1974
[21] Appl. No.: 527,416

[30] Foreign Application Priority Data
Nov. 27, 1973   Japan.............................. 48-133867

[52] U.S. Cl................................. 354/234; 354/50; 354/238; 354/246; 354/247; 354/248; 354/249
[51] Int. Cl.²......................................... G03B 9/08
[58] Field of Search................ 354/49, 50, 226–265

[56] References Cited
UNITED STATES PATENTS
| 2,572,229 | 10/1951 | Willcox | 354/235 |
| 3,116,670 | 1/1974 | Ball | 354/50 |
| 3,124,049 | 3/1964 | Ball | 354/50 |
| 3,513,763 | 5/1970 | Singer | 354/246 |
| 3,628,434 | 12/1971 | Leitz et al. | 354/249 |

Primary Examiner—Russell E. Adams, Jr.
Attorney, Agent, or Firm—Fleit & Jacobson

[57] ABSTRACT

A leading blind and a trailing blind are made of rigid material such as metal sheet and each is provided with at least one permanent magnet. Along the path of the blinds are arranged electromagnetic coils. Each magnet mounted on the blind has a brush which is in slidable contact with the contacts connected with the electromagnetic coils. The magnet on the blind and the electromagnetic coils arranged in a line along the path of the blind constitute a linear motor to drive the blind. The coils are connected with an exposure control circuit and are energized to drive the blind. The leading blind is driven upon depression of a shutter release button and the trailing blind is driven when a time determined by the exposure control circuit has lapsed. In a preferred embodiment of the invention, the blind is divided into a driving blade and a follower blade to save the space occupied by the blind.

6 Claims, 19 Drawing Figures

ELECTROMAGNETIC FOCAL PLANE SHUTTER

BACKGROUND OF THE INVENTION

1. Field of the Invention

This invention relates to a novel focal plane shutter, and more particularly to a focal plane shutter the leading blind and the trailing blind of which are driven by an electromagnetic force utilizing the principle of a linear motor.

2. Description of the Prior Art

In the conventional focal plane shutter, the leading blind and the trailing blind are brought to the charged position and a spring which drives the blinds is charged in response to or by the film wind-up operation. In this kind of conventional focal plane shutter, it is necessary to provide a transmission device which transmits the motion of the film wind-up lever to the shutter blinds. Such a transmission device has a complicated construction and occupies a large space and consequently causes an increase in the size and in the cost of manufacture of a camera having a focal plane shutter.

SUMMARY OF THE INVENTION

In the light of the foregoing observations and description of the conventional focal plane shutter, the primary object of the present invention is to provide a focal plane shutter which is driven by an electromagnetic force and accordingly is simple in construction and small in size.

Another object of the present invention is to provide a focal plane shutter the leading and trailing blinds of which are driven by an electromagnetic force utilizing the principle of a linear motor, and accordingly, the thickness of which is small.

Still another object of the present invention is to provide a focal plane shutter in which no transmission mechanism is used for transmitting the motion of the film wind-up lever to the shutter charging means.

A further object of the present invention is to provide a focal plane shutter which is controlled by an electric shutter control circuit.

The above mentioned objects of the present invention are accomplished by the present invention in the manner summarized below.

The focal plane shutter in accordance with the present invention is characterized in that the leading blind and the trailing blind are caused to run by an electromagnetic force utilizing the principle of a linear motor. Electromagnets which work as a linear motor to drive the shutter blinds are connected with an exposure control circuit which fixes the exposure time in accordance with the brightness of the object to be photographed. As for the linear motor, a combination of permanent magnets or electromagnets and a group of magnetic coils can be used. The permanent magnets or the electromagnets are mounted on the shutter blind and the magnetic coils are provided in the camera along the path of the shutter blinds. In this specification, the permanent magnets or the electromagnets mounted on the shutter blind are simply referred to as the "magnets." The magnets which are employed in the embodiment of the present invention described hereinafter are permanent magnets. It will be understood that the magnets may be located in the camera and the group of magnetic coils may be mounted on the shutter blind. From the viewpoint of the practical manufacture of the camera, however, it is desirable that the magnets be mounted on the blind and the coil group be stationarily located in the camera.

As for the leading blind and the trailing blind of the focal plane shutter, there are used, for example, non-magnetizable metal blades. In the preferred embodiment described hereinafter, the leading blind and the trailing blind are each divided into two blades to reduce the space occupied by the blinds when the blinds are in the folded position and in travel. The divided blades of the trailing blind are superposed when the blind is in the folded position to be ready for exposure, and the divided blades of the leading blind are in the extended position to cover the aperture. When the shutter is released, the divided blades of the leading blind are folded to open the aperture and the divided blades of the trailing blind are extended to cover the aperture running after the leading blind.

Various other objects, features and advantages of the present invention will become more apparent by reference to the following detailed description of a preferred embodiment thereof taken in conjunction with the accompanying drawings as follows.

PREFERRED EMBODIMENTS OF THE INVENTION

Figure 1:
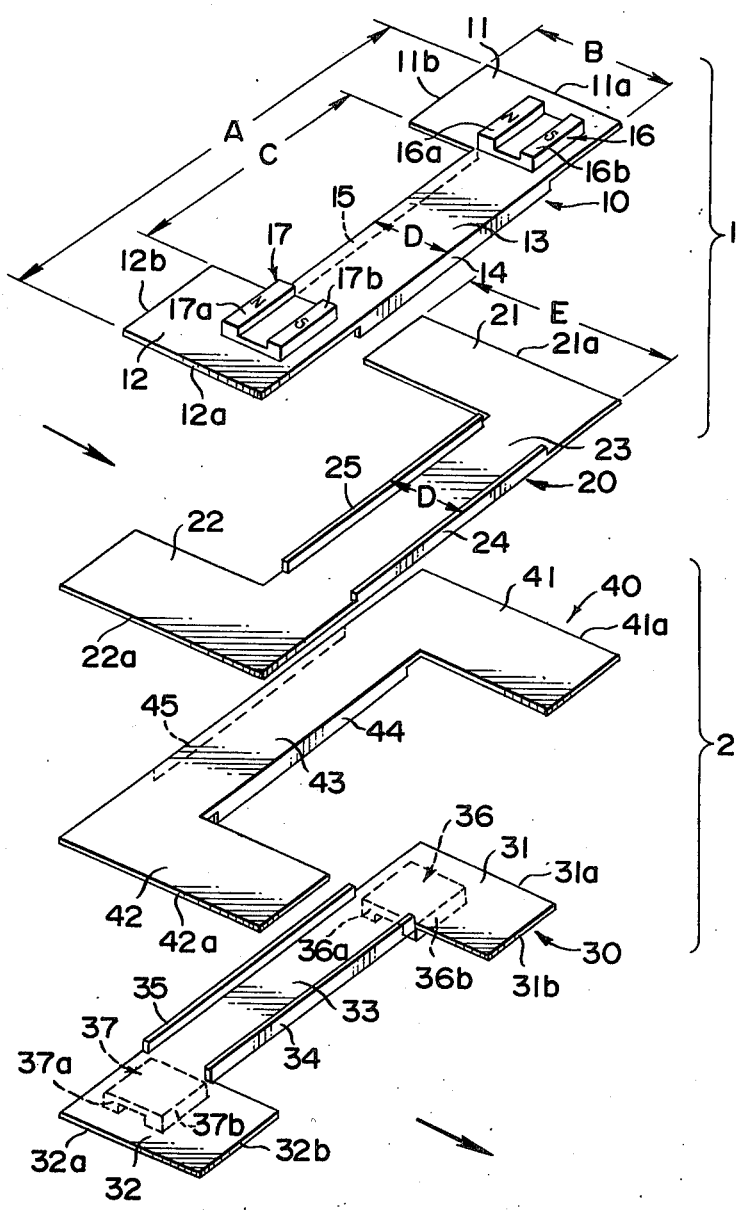
FIG. 1 is an exploded perspective view showing the divided blades of the shutter blinds of the focal plane shutter of the present invention.

Referring to FIG. 1 which shows in an exploded view the shutter blinds of the focal plane shutter in accordance with an embodiment of the invention, the leading blind 1 and the trailing blind 2 are each comprised of two shutter blades, 10 and 20, and 30 and 40, respectively. Each shutter blade has a width corresponding to about half of the width of the aperture of the camera so that the aperture may be closed by the shutter blades when the blades are extended. When the shutter blades are folded completely, the aperture is fully opened. One of the two shutter blades of each blind is provided with a pair of magnets and driven by an electromagnetic force induced between the magnets and magnetic coils in accordance with the principle of a linear motor. The shutter blade provided with the magnets will hereinafter be referred to as the "driving blade. " The other shutter blade is mechanically engaged with the driving blade and follows the movement thereof.

The aperture of the ordinary 35mm camera is 35mm in width and 25mm in height. Therefore, it is preferable to have the shutter blades run in the vertical direction to reduce the space occupied by the shutter blades since the shutter blades employed in this invention are not flexible. In the preferred embodiment of the invention, the shutter blinds are divided horizontally and designed to rum vertically. The width, namely, the height of each shutter blade is accordingly about a half of the height of the aperture. In the embodiment, the width of the shutter blades is 13mm.

The leading blind 1 comprises a first driving blade 10 and a first follower blade 20. The first driving blade 10 is non-magnetizable metal sheet about 0.2mm thick, both surfaces of which are mirror coated. The first driving blade 10 has an intermediate portion 13 of rectangular shape and two end portions 11 and 12 extending in parallel to each other. The intermediate portion 13 of the driving blade 10 is provided at opposite edges thereof with a pair of vetically bent portions 14 and 15 extending on the same side of the blade. On the other side of the driving blade 10 is mounted a pair of magnets 16 and 17 having pairs of protrusions 16a and 16b, and 17a and 17b magnetized in the opposite polarities. The first follower blade 20 is not provided with a magnet, but comprises an intermediate portion 23 of rectangular shape and two end portions 21 and 22 extending in parallel similarly to the first driving blade 10. The end portions 21 and 22 of the first follower blade 20 are made longer than those of the first driving blade 10. The Intermediate portion 23 of the follower blade 20 is also provided with a pair of vertically bent portions 24 and 25 at opposite edges thereof. The bent portions 24 and 25 provided at the edges of the intermediate portion 23 of the first follower blade 20 are both provided on the side of the blade 20 which allows them to engage with the bent portions 14 and 15 of the driving blade 10.

The trailing blind 2 comprises a second driving blade 30 and a second follower blade 40 which are exactly the same as the corresponding blades of the leading blind 1. The second driving blade 30 comprises an intermediate portion 33 and two end portions 31 and 32 extending in parallel to each other and is provided with a pair of magnets 36 and 37 on the same side thereof. The magnets 36 and 37 are provided with pairs of protrusions 36a and 36b, and 37a and 37b magnetized in the opposite polarities. The intermediate portion 33 of the second driving blade 30 is also provided with a pair of vertically bent portions 34 and 35 at opposite edges thereof. The second follower blade 40 comprises, similarly to the first follower blade 20, an intermediate portion 43 and two end portions 41 and 42 extending in parallel to each other. Further, the intermediate portion 43 is provided at opposite edges thereof with a pair of vertically bent portions 44 and 45. The bent portions 44 and 45 are on the side of the blade 40 which allows them to engage with the bent portions 34 and 35 of the second driving blade 30.

Figure 2:
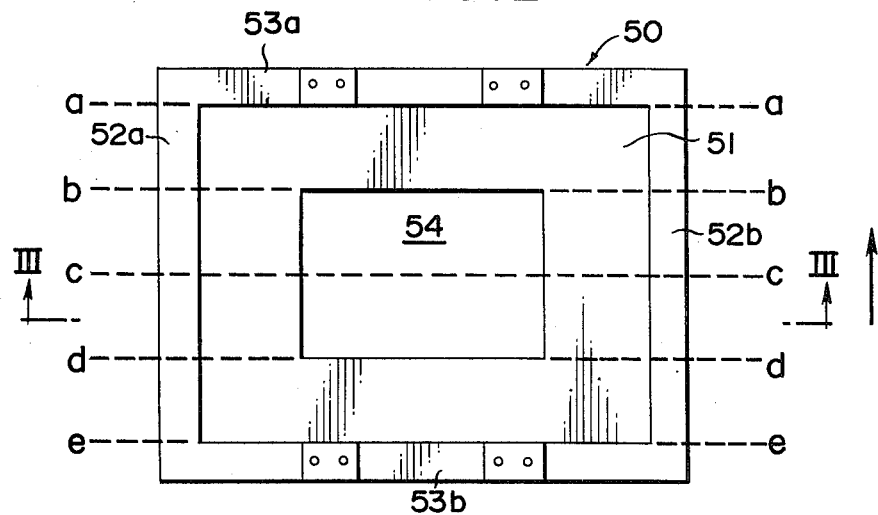
FIG. 2 is a plan view of the shutter frame with an aperture employed in this invention to hold the shutter blinds.
Figure 3:
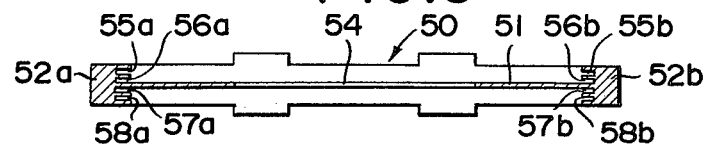
FIG. 3 is a vertical sectional view of the shutter frame taken along the line III—III in FIG. 2.
Figure 4:
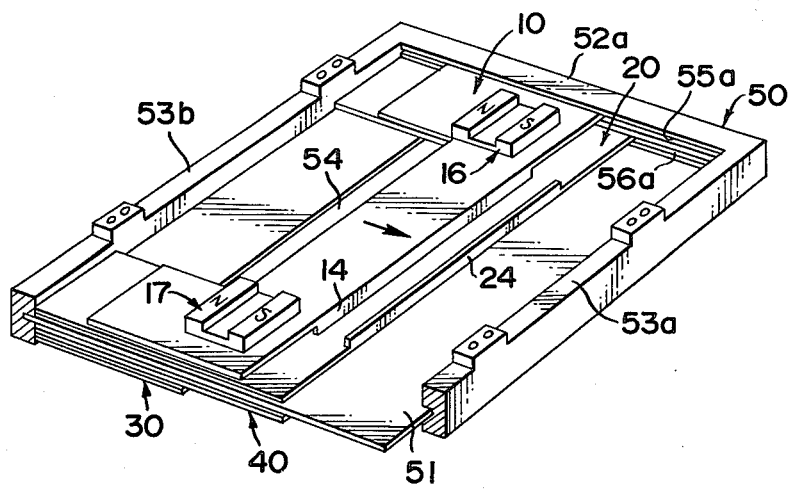
FIG. 4 is a partly broken away perspective view of the focal plane shutter comprising the shutter frame and the shutter blinds provided therein.

The above described four blades 10, 20, 30 and 40 are slidably mounted to a shutter frame 50 with an aperture 54 as shown in FIGS. 2 to 4. The shutter frame 50 comprises an aperture plate 51 which is provided at the center thereof with an aperture 54 for exposure, and a square frame consisting of four frame edges 52a, 52b, 53a and 53b. On the inner surface of the frame edges 52a and 52b are provided guide grooves 55a, 55b, 56a, 56b, 57a, 57b, 58a and 58b extending in parallel to each other and to the aperture plate 51 from one end to the other as shown in FIG. 3. The aperture plate 51 is located between the second grooves 56a and 56b and the third grooves 57a and 57b.

The broken lines $a$—$a$, $b$—$b$, $c$—$c$, $d$—$d$, and $e$—$e$ shown in FIG. 2 are imaginary lines indicating the positions relative to the shutter frame 50 which will hereinafter be used for indicating positions for the convenience in describing the operation of the shutter blinds. The first line $a$—$a$ indicates the upper end of the aperture plate 51, the second line $b$—$b$ indicates the upper end of the aperture 54, the third line $c$—$c$ indicates the center of the aperture 54, the fourth line $d$—$d$ indicates the lower end of the aperture 54, and the fifth line $e$—$e$ indicates the lower end of the aperture plate 51.

In the first grooves 55a and 55b is slidably provided said first driving blade 10, in the second grooves 56a and 56b is slidably provided said first follower blade 20, in the third grooves 57a and 57b is slidably provided said second follower blade 40, and in the fourth grooves 58a and 58b is slidably provided said second driving blade 30.

The side end 11a of one end portion 11 of the first driving blade 10 is inserted into the groove 55a and the side end 12a of the other end portion 12 thereof is inserted into the groove 55b so that the bent portions 14 and 15 thereof are directed to the aperture plate 51. Further, the back ends 11b and 12b of the end portions 11 and 12 of the first driving blade 10 are directed downward in FIG. 2 so that the back ends 11b and 12b may abut on the upper side of the lower frame edge 53b. Similarly, the first follower blade 20 is slidably mounted in the frame 50 with the side ends 21a and 22a of the end portions 21 and 22 inserted into the grooves 56a and 56b, respectively, so that the back end of the end portions may abut on the upper side of the lower frame edge 53b. The length B of the end portions 11 and 12 of the first driving blade 10 is twice as long as the length D of the intermediate portion 13. The length D of the intermediate portion 13 is about the half of the vertical length or height of the aperture 54. The length E of the end portions 21 and 22 of the first follower blade 20 is three times as long as the length D of the intermediate portion 23 thereof. Therefore, when the back ends 11b and 12b of the first driving blade 10 and the back ends of the first follower blade 20 are in contact with the upper side of the lower frame edge 53b of the shutter frame 50, the upper half of the aperture 54 between the lines $b$—$b$ and $c$—$c$ is covered by the intermediate portion 23 of the follower blade 20 and the lower half of the aperture 54 between the lined $c$—$c$ and $d$—$d$ is covered by the intermediate portion 13 of the driving blade 10. Thus, in the stand-by state, the aperture 54 of the aperture plate 51 is closed by the leading blind 1 consisting of the first driving blade 10 and the first follower blade 20. When the first driving blade 10 and the first follower blade 20 are in the uppermost position with the front end thereof being in contact with the lower side of the upper frame edge 53a, the intermediate portions 13 and 23 of the two blades 10 and 20 are in the position between the lines a—a and b—b to fully open the aperture 54. Thus, the leading blind 1 closes and opens the aperture 54.

Quite similarly, the second driving blade 30 and the second follower blade 40 constituting the trailing blind 2 are slidably mounted in the shutter frame 50 with the side ends 31a, 32a, 41a and 42a inserted in the fourth and third grooves 58a, 58b, 57a and 57b, respectively. The front ends 31b and 32b of the end portions 31 and 32 of the second driving blade 30 are directed toward the upper frame edge 53a so as to be able to contact the lower side thereof. The front end of the second follower blade 40 is also directed toward the upper frame edge 53a so as to be able to contact the lower side thereof. The bent portions 34 and 35 of the second driving blade 30 are directed toward the aperture plate 51 to be engageable with the bent portions 44 and 45 of the second follower blade 40 directed in the opposite direction. The orientation of the blades 10, 20, 30 and 40 described above will be readily understood by reference to the exploded view shown in FIG. 1. As will be understood from the above description, the aperture 54 is covered by the intermediate portions, of the second driving blade 30 and the second follower blade 40 when the front ends thereof are in contact with the lower side of the upper frame edge 53a, and the aperture 54 is fully opened when the back ends of the second driving blade 30 and the second follower blade 40 are in contact with the upper side of the lower frame edge 53b. The second driving blade 30 and the second follower blade 40 are in contact with the lower frame edge 53b in the stand-by state and moved upward to close the aperture 54 when the shutter is released. The intermediate portion 33 of the second driving blade 30 covers the upper half of the aperture between the lines b—b and c—c, and the intermediate portion 43 of the second follower blade 40 covers the lower half of the aperture 54 when the blades 30 and 40 are in the upper position moved from the stand-by lower position.

The front bent portion 14 of the first driving blade 10 is located between the bent portions 24 and 25 of the first follower blade 20 so that the first follower blade 20 may be moved back and forth by the movement of the first driving blade 10. The rear bent portion 35 of the second driving blade 30 is located between the bent portions 44 and 45 of the second follower blade 40 so that the second follower blade 40 may be moved back and forth by the movement of the second driving blade 30.

Figure 9A:
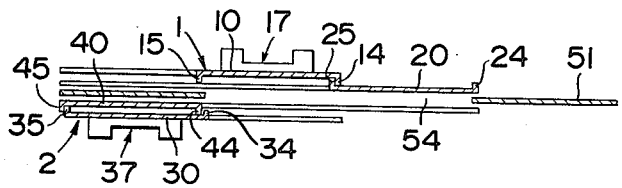
FIGS. 9A to 9H are vertical sectional views showing the operation of the shutter blinds of the focal plane shutter in accordance with the present invention.
Figure 9B:
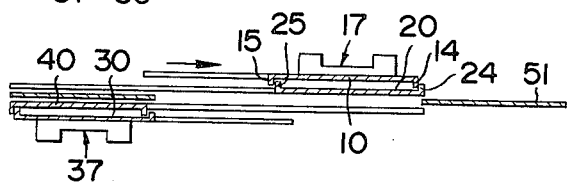
Figure 9C:
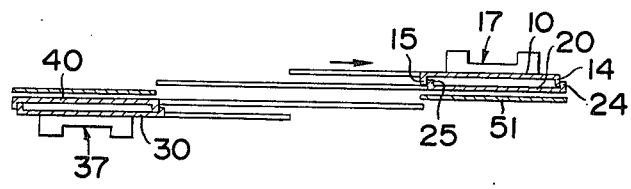
Figure 9D:
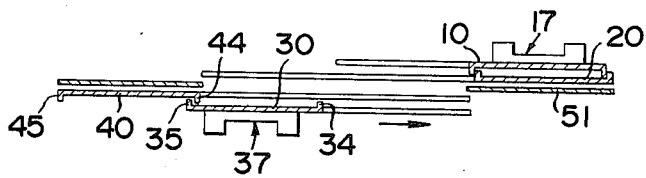
Figure 9E:
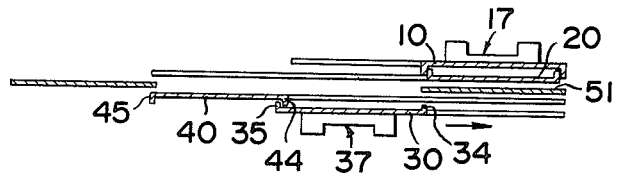

The operation of the shutter blinds 1 and 2 is illustrated in detail in FIGS. 9A to 9H. FIG. 9A shows the stand-by state wherein the first driving blade 10 and the first follower blade 20 cover the aperture 54 and the second driving blade 30 and the second follower blade 40 are in the retracted position to open the aperture 54. When the shutter is released, the first driving blade 10 is moved to the right as shown in FIG. 9B by an electromagnetic force induced between the magnets 16 and 17 mounted thereon and magnetic coils which will be described hereinafter. When the first driving blade 10 comes to a point where the front bent portion 14 thereof abuts on the front bent portion 24 of the first follower blade 20 and the rear bent portion 15 of the former abuts on the rear bent portion 25 of the latter, the follower blade 20 starts to run in the same direction in engagement with the driving blade 10. Then, the follower blade 20 is brought to the right end by the driving blade 10 as shown in FIG. 9C. In the state shown in FIG. 9C, the aperture 54 is fully opened. Then, the second driving blade 30 is driven to the right by a similarly induced electromagnetic force to close the aperture 54. When the second driving blade 30 covers half of the aperture 54 as shown in FIG. 9D, the rear bent portion 35 of the second driving blade 30 is brought into engagement with the front bent portion 44 of the second follower blade 40. Then, the second follower blade 40 starts to run together with the second driving blade 30. When the second driving blade 30 and the second follower blade 40 reach the right end of the frame 50 (the upper end of the frame 50 in FIG. 2) as shown in FIG. 9E, the aperture 54 is covered by the trailing blind 2 consisting of the second driving blade 30 and the second follower blade 40.

In order to cause the shutter blades to run as described above, there are provided a series of magnetic coils in the vicinity of the magnets 16, 17, 36 and 37 of the driving blades 10 and 30. Since the magnetic coil group provided for one of the magnets 16, 17, 36 and 37 is quite the same in construction at those for the other magnets, only one magnetic coil group for the magnet 16 mounted on the first driving blade 10 will be described hereinbelow, referring to FIGS. 5 to 7.

Figure 5:
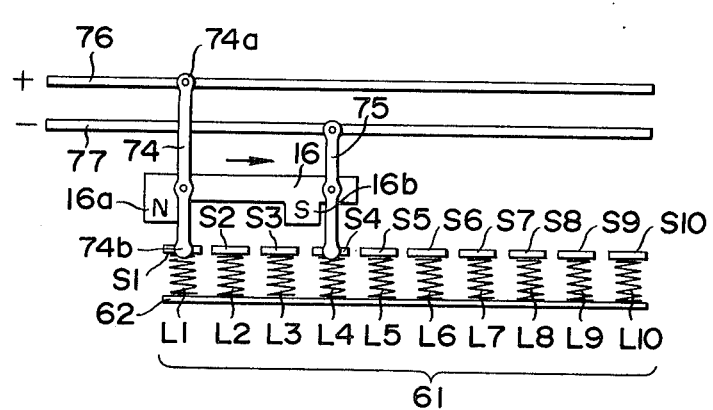
FIG. 5 is a side view of the magnet mounted on one of the shutter blinds and the magnetic coils working in combination with the magnet as a linear motor to drive the shutter blind in the present invention.
Figure 6:
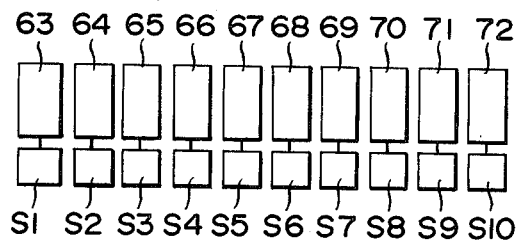
FIG. 6 is a partial plan view showing the arrangement of the magnetic coils and the contacts connected therewith.

The magnetic coil group 61 consists of a number of magnetic coils L1 to L10 arranged in a series along the path of the magnet 16. The magnetic coils L1 to L10 are connected at an end thereof with print contacts S1 and S10 by way of electromagnetic plates 63 to 72, respectively, and connected at the other end thereof with a print wire 62. When the magnetic coils L1 to L10 are energized, the electromagnetic plates 63, 64, . . . 72 are magnetized in one polarity. A pair of brushes 74 and 75 are fixed to the side of the magnet 16. The brushes 74 and 75 are displaced to the right from the center of the protrusions 16a and 16b of the magnet 16 as shown in FIG. 5. One end 74a of the brush 74 is in slidable contact with a print wire 76 of the plus (+) polarity and the other end 74b of the brush 74 is in slidable contact selectively with said print contacts S1 to S10. Similarly, one end of the other brush 75 is in slidable contact with a print wire 77 of the minus (−) polarity and the other end thereof is in slidable contact selectively with said print contacts S1 to S10. As will be understood from the foregoing description of the magnetic coil group 61 and the magnet 16, the magnet 16 is pulled to the right by an electromagnetic force made between the protrusions 16a and 16b and the first and fourth electromagnetic plates 63 and 66.

Figure 8:
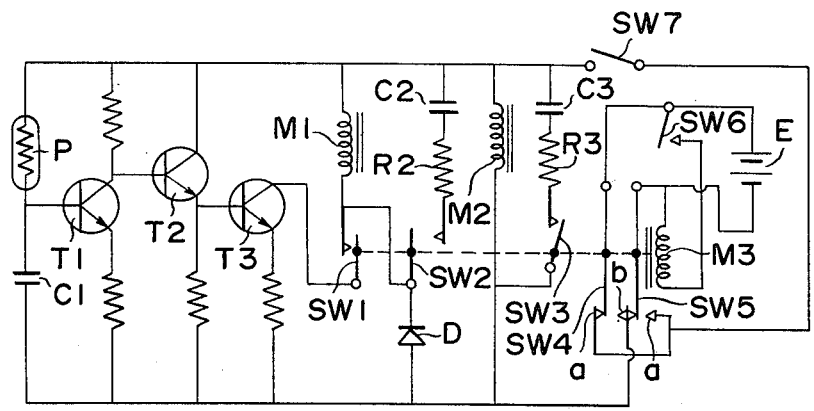
FIG. 8 is a schematic view of the electric circuit of the exposure control circuit which controls the exposure time obtained by the focal plane shutter in accordance with the present invention.

FIG. 8 is a schematic view of the electric circuit for controlling exposure in accordance with an embodiment of the present invention. A photodetector P and a capacitor C1 connected therewith constitute a time constant circuit. Three transistors T1, T2 and T3 are connected in series with the connecting point of the photodetector P and the capacitor C1 and form an amplifier to amplify the output of the time constant circuit. With the collector of the third transistor T3 are connected in series a switch SW1 closed by a switchover coil M3 described hereinafter and a magnetic coil group M1. In parallel with the magnetic coil group M1 are connected a second switch SW2 and a series circuit of a capacitor C2 and a resistor R2. A diode D for preventing reverse current is connected in series with the second switch SW2. The reference characters M1 and M2 indicate magnetic coil groups like the magnetic coil group 61 shown in FIG. 5. The magnetic coil group M1 is provided in the vicinity of the magnets 36 and 37 mounted on the second driving blade 30 while the magnetic coil group M2 is provided in the vicinity of the magnets 16 and 17 mounted on the first driving blade 10. The magnetic coil groups M1 and M2 constitute linear motors together with the magnets 16, 17, 36 and 37. In parallel with the magnetic coil group M2 is connected a series circuit of a capacitor C3, a resistor R3 and a third switch SW3. A fourth switch SW4 and a fifth switch SW5 constitute a double throw switch having two fixed contacts $a$ and $b$. The double throw switch SW4 and SW5 is connected with an electric source E together with a sixth switch SW6 to switch over the direction of the polarity of the electric source E upon completion of the movement of the trailing blind. When the trailing blind finishes covering the aperture, the sixth switch SW6 is closed and the double throw switch SW4 and SW5 is switched over. Since the linear motor requires a large amount of current, the source E should be of high power. A switch over coil M3 is connected in series with the sixth switch SW6 for switching over the switches SW1, SW2, SW3, SW4 and SW5. A main switch SW7 is connected with the double throw switch SW4 and SW5. The main switch SW7 is closed upon depression of a shutter release button.

The operation of the focal plane shutter in accordance with the present invention will be described in detail with reference to FIG. 8 and FIGS. 9A to 9H.

When the shutter is closed, the first driving blade 10 and the first follower blade 20 cover the aperture 54 of the shutter frame as shown in FIG. 9A. The back ends of the driving blade 10 and the follower blade 20 are in contact with the lower frame edge 53$b$ and the rear bent portion 25 of the follower blade 20 is in contact with the front bent portion 14 of the driving blade 10. In the circuit as shown in FIG. 8, the first switch SW1 and the third switch SW3 are closed and the second switch SW2 and the sixth switch SW6 are open. The fourth switch SW4 is in contact with the fixed contact $a$ and the fifth switch SW5 is in contact with the fixed contact $b$. Upon depression of a release button in this state, the seventh switch SW7 is closed and the magnetic coil group M2 for the leading blind 1 is energized thereby when the delay time determined by the capacitor C3 and the resistor R3, e.g. 1/30 second, has lapsed. Thus, a closed circuit is formed through the print wire 76 of the plus (+) side, the brush 74, the print contact S1, the magnetic coil L1, the print wire 62, the magnetic coil L4, the print contact S4, the brush 75, the print wire 77 of the minus (−) side, and the electric source E. By the energization of the magnetic coils L1 and L4, the electromagnetic plate 63 of the magnetic coil L1 is magnetized is S-polarity and the electromagnetic plate 66 of the magnetic coil L4 magnetized in N-polarity. Therefore, the electromagnetic plate 63 attracts the protrusion 16$a$ of the magnet 16 and the electromagnetic plate 66 attracts the protrusion 16$b$ of the magnet 16. Consequently, the magnet 16 is moved to the right as indicated by an arrow in FIG. 5. When the protrusion 16$a$ of N-polarity of the magnet 16 reaches the first magnetic plate 63 and the protrusion 16$b$ of S-polarity of the magnet 16 reaches the fourth electromagnetic plate 66, the brushes 74 and 75 are in contact with the next print contacts S2 and S5. Therefore, the electromagnetic plates 63 and 66 are demagnetized and the next electromagnetic plates 64 and 67 are magnetized. Accordingly, the magnet 16 is further moved to the right. Similarly, the magnetic coil group provided in the vicinity of the other magnet 17 mounted to the first driving blade 10 is also moved to the right. Thus, the first driving blade 10 is moved to the right in FIG. 9A. As described hereinbefore, the follower blade 20 follows the driving blade 10 as the driving blade 10 moves to the right as shown in FIG. 9B.

When the first driving blade 10 and the first follower blade 20 are moved to the rightmost position as shown in FIG. 9C, the aperture 54 is fully open to expose the film in the camera. Simultaneously, the photodetector P receives light and a photocurrent flows through the capacitor C1 and the capacitor C1 is charged. When the capacitor C1 is charged up to a predetermined level, the third transistor T3 is turned on and the magnetic coil group M1 for the trailing blind 2 is energized. Thus, the magnets 36 and 37 mounted to the second driving blade 30 are attracted by the magnetic coils in the group M1 and the second driving blade 30 is moved to the right as shown in FIG. 9D to close the aperture 54. When the second driving blade 30 is moved to the right, the rear bent portion 35 thereof is brought into engagement with the front bent portion 44 of the second follower blade 40 and the second follower blade 40 is moved to the right together with the driving blade 30 as shown in FIG. 9E. When the second driving blade 30 and the second follower blade 40 are moved to the rightmost position as shown in FIG. 9E, the aperture 54 is completely closed by the intermediate portions 33 and 44 thereof.

Figure 9F:
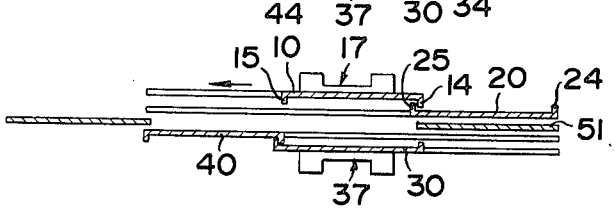
Figure 9G:
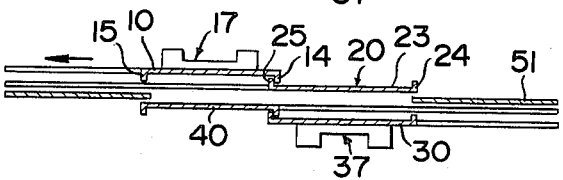

When the trailing blind 2 reaches its rightmost position, the sixth switch SW6 is closed and the switchover coil M3 is energized to open the switches SW1 and SW3 and close the switch SW2. Simultaneously, the fourth switch SW4 is switched to the fixed contact $b$ and the fifth switch SW5 is switched to the fixed contact $a$. Since the electric source E is applied in reverse polarity by the switching action of switches SW4, SW6 and SW5, the magnetic coil group M2 is provided with a reversed current. Consequently, the first driving blade 10 of the leading blind 1 is moved to the left as shown in FIG. 9F. In the course of the leftward movement of the first driving blade 10, the front bent portion 14 thereof falls into engagement with the rear bent portion 25 of the first follower blade 20 and the follower blade 20 is pulled to the left together with the first driving blade 10 until both blades 10 and 20 return to the starting position as shown in FIg. 9G.

Figure 9H:
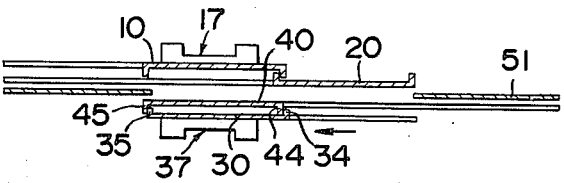

After the leading blind 1 is returned to the original position or when the delay time determined by the capacitor C2 and the resistor R2 has lapsed, the magnetic coil group M1 for the trailing blind 2 is energized. By the energization of the magnetic coil group M1, the second driving blade 30 is moved to the left. In the course of the leftward movement of the second driving blade 30, the front bent portion 34 of the second driving blade 30 falls into engagement with the front bent portion 44 of the follower blade 40 and the second follower blade 40 is moved to the left as shown in FIG. 9H. Thus, the trailing blind 2 is moved back to the original position as shown in FIG. 9A.

Upon the complete return of the trailing blind 2 to the initial position, the sixth and seventh switches SW6 and SW7 are opened and the magnetic coil groups M1 and M2 and the switchover coil M3 are all demagnetized. Upon demagnetization of the switchover coil M3, the switches SW1 and SW3 are closed and the switch SW2 is opened. Further, the switch SW4 is switched to the fixed contact *a* and the switch SW5 is switched to the fixed contact *b*. Further, by the demagnetization of the magnetic coils M1 and M2, the driving of the leading blind and the trailing blind is ceased and the shutter operation is completed.

Figure 7:
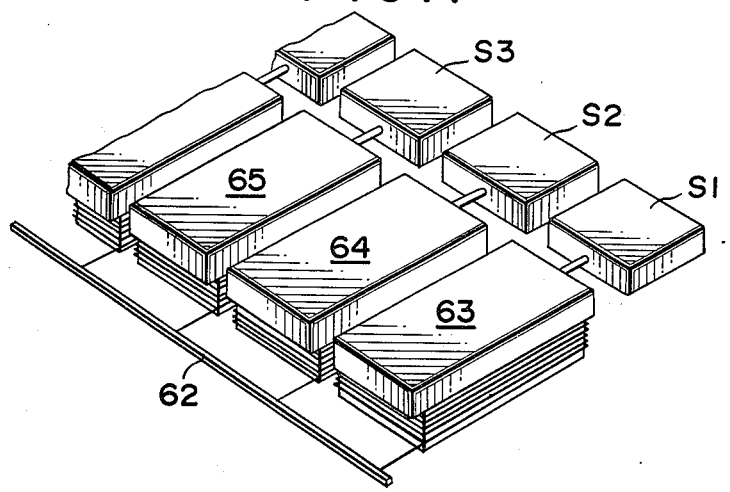
FIG. 7 is a partial perspective view showing the arrangement of the magnetic coils and the contacts connected therewith.
Figure 10:
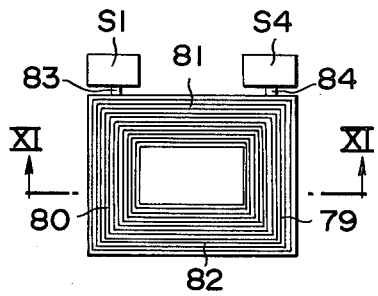
FIG. 10 is a plan view showing another example of the magnetic coils employed in the present invention.
Figure 11:
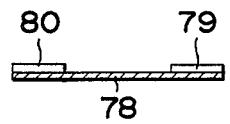
FIG. 11 is a side sectional view of a magnetic coil element employed in the magnetic coil shown in FIG. 10.
Figure 12:
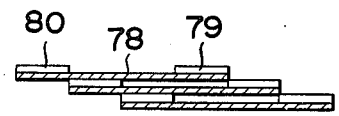
FIG. 12 is a side sectional view showing the arrangement of the magnetic coil elements constituting the magnetic coil shown in FIG. 10.

The magnetic coil group 61 shown in FIGS. 5 and 7 can be replaced by a set of print coils as shown in FIGS. 10 to 12. Referring to FIGS. 10 to 12, print coil wires 79, 80, 81 and 82 arranged in a square and lead wires 83 and 84 are formed on a thin plastic film 78 by the method of photoetching, and print contacts S1 and S4 are soldered to the lead wires 83 and 84. By superposing the print coils as shown in FIG. 12 with one third part thereof displaced. The space between the print coil wires 81 and 82 is made larger than the width of the magnets 16, 17, 36 and 37. Further, the space between the print coil wires 79 and 80 provided with the print contacts S1 and S4 is made three times as large as the width of the protrusion of the magnet and the width of the print coil wires 79 and 80 is made equal to the width of the magnet. Further, it will be understood that the print coils can be mounted to the driving blades 10 and 30 in place of the magnets.

I claim:

1. An electromagnetic focal plane shutter for a camera having an exposure aperture comprising, in combination, a shutter frame associated with the camera exposure aperture, a leading blind of rigid sheet material mounted on said shutter frame for freely slidable reciprocating movement in a first path, said leading blind comprising a first driving blade and a follower blade engageable with said first driving blade, said first driving blade and follower blade each including an intermediate portion for closing one half of the exposure aperture at one end of said first path and being movable into overlying relationship to fully open the exposure aperture at the other end of said first path, a trailing blind of rigid sheet material mounted on said shutter frame for freely slidable reciprocating movement in a second path adjacent said leading blind and in parallel relationship therewith independently of each other, said trailing blind including a second driving blade and a follower blade engageable with said driving blade, said trailing blind driving blade and follower blade each including an intermediate portion and being movable into superimposed relationship to fully open the exposure aperture at one end of said second path and into cooperating relationship so that said intermediate portions close one half of the exposure aperture at the other end of said second path, a linear motor operatively associated with each of said blinds for moving each of said blinds along their respective paths and a shutter control circuit for selectively energizing said linear motors, to move said leading and trailing blinds sequentially for opening and closing the exposure aperture in the camera, said linear motors including a leading blind magnet positioned on said first driving blade and a row of electromagnetic coils associated with said first driving blade magnet, a trailing blind magnet positioned on said second driving blade, and a row of electromagnetic coils associated with said second driving blade magnet, and wherein said rows of electromagnetic coils are positioned on opposite sides of said shutter frame.

2. An electromagnetic focal plane shutter in accordance with claim 1 wherein said shutter control circuit includes an exposure measuring circuit responsive to the light passing through the exposure aperture in the open condition for regulating the period of time between the opening and closing of the exposure aperture by said leading and trailing blinds, respectively.

3. An electromagnetic focal plane shutter in accordance with claim 1 wherein said linear motor includes at least one magnet mounted on each of said blinds, at least one row of electromagnetic coils associated with each of said magnets, said row of electromagnetic coils extending along the path of its respective blind, a contact on each of said electromagnet coils, a brush on each of said magnets arranged for slidable engagement with the contacts of the associated row of coils.

4. An electromagnetic focal plane shutter in accordance with claimm 1 wherein said shutter frame is of rectangular shape having a pair of side frame members and a pair of end frame members and wherein said leading blind includes an intermediate portion for closing the exposure aperture at one end of said first path and for opening the exposure aperture at the other end of first path, said trailing blind including an intermediate portion for opening the exposure aperture at one end of said second path and for opening the exposure aperture at the opposite end of said second path.

5. An electromagnetic focal plane shutter in accordance with claim 1 wherein the intermediate portion of said driving blades are provided with upstanding flanges extending upwardly on one side thereof and wherein said follower blades are provided with upstanding flanges on the intermediate portion thereof on the side opposite to the sides of the driving blades provided with such flanges, said flanges on said driving blades and follower blades being arranged to engage for movement of said follower blades during the movement of said driving blades.

6. An electromagnetic focal plane shutter for a camera comprising, in combination, a shutter frame having an exposure aperture of rectangular shape defined by two pairs of opposed parallel internal walls, one pair of said opposed internal walls being provided with parallel guide grooves, a rigid leading blind movable back and forth in one of said grooves in each said wall to open and close said exposure aperture, a rigid trailing blind movable back and forth in the other groove to close and open said exposure aperture independently of said leading blind, at least one magnet fixed to said leading blind, at least one magnet fixed to said trailing blind, at least two series of electromagnetic coils arranged in lines along said grooves one associated with each said magnet in the vicinity thereof and disposed on opposite sides of said shutter frame, each said electromagnetic coil having a contact, each said magnet having a brush in slidable contact with the contacts of said coils of the series associated therewith, whereby each said magnet and its associated series of electromagnetic coils constitute a linear motor acting on its respective blind, a shutter control circuit connected with said electromagnetic coils for energizing the coils to drive the linear motors and cause the blinds with the magnets to run in the groove by an electromagnetic force, and a shutter speed control circuit connected with said shutter control circuit for making the electromagnetic coils associated with the magnet fixed to the trailing blind be energized to start the trailing blind when a selected time has lapsed after the electromagnetic coils associated with the magnets fixed to the leading blind is energized to start the leading blind.

* * * * *